(12) United States Patent
Akkapeddi et al.

(10) Patent No.: US 11,785,012 B2
(45) Date of Patent: Oct. 10, 2023

(54) DATA PROCESSING FOR INTERNET OF THINGS (IOT) DEVICES BASED ON RECORDED USER BEHAVIOR

(71) Applicant: Bank of America Corporation, Charlotte, NC (US)

(72) Inventors: Naga Vamsi Krishna Akkapeddi, Charlotte, NC (US); Pratap Dande, Saint Johns, FL (US)

(73) Assignee: Bank of America Corporation, Charlotte, NC (US)

(*) Notice: Subject to any disclaimer, the term of this patent is extended or adjusted under 35 U.S.C. 154(b) by 165 days.

(21) Appl. No.: 17/340,481

(22) Filed: Jun. 7, 2021

(65) Prior Publication Data

US 2022/0394033 A1    Dec. 8, 2022

(51) Int. Cl.
*H04L 9/40*      (2022.01)
*H04L 67/12*     (2022.01)
*H04L 67/50*     (2022.01)
*G16Y 40/30*    (2020.01)

(52) U.S. Cl.
CPC .............. *H04L 63/10* (2013.01); *G16Y 40/30* (2020.01); *H04L 67/12* (2013.01); *H04L 67/535* (2022.05)

(58) Field of Classification Search
CPC ......... G06F 1/163; H04L 67/02; H04L 67/10; H04L 65/1069; H04L 69/329; H04L 12/2803; H04L 12/2825; H04L 2012/285; H04L 12/40013; H04L 12/2816; H04L 12/2827; H04L 67/12; H04L 12/2807; H04L 12/282; H04L 12/2829; H04L 12/283; H04L 2012/2847; H04L 67/34; H04L 67/535; H04L 67/55; H04L 67/62; H04L 65/403; H04L 65/611; G06Q 10/0631; G06Q 10/109; G06Q 10/1093; G06Q 10/10; G16Y 40/30; G16Y 40/35; G16Y 40/50

See application file for complete search history.

(56) References Cited

U.S. PATENT DOCUMENTS

| 9,578,511 | B2 | 2/2017 | Kashef et al. |
| 9,686,362 | B2 | 6/2017 | Choi et al. |
| 9,836,182 | B2 | 12/2017 | Park et al. |
| 9,917,824 | B2 | 3/2018 | Britt |
| 9,967,728 | B2 | 5/2018 | Logue et al. |
| 9,998,281 | B2 | 6/2018 | Nix |
| 10,030,884 | B2 | 7/2018 | Matsuoka |

(Continued)

FOREIGN PATENT DOCUMENTS

| AU | 2019275648 B2 | 10/2020 |
| AU | 2019275643 B2 | 12/2020 |

(Continued)

*Primary Examiner* — David R Lazaro

(57) ABSTRACT

A user device is configured to receive a request to connect an Internet of Things (IoT) device to the user device. In response, the user device connects to the IoT device. The user device detects that the user device performed a first transaction related to the IoT device and records the first data transaction as a behavior. Based on the recorded behavior, the user device determines a second data transaction that can be performed relating to the IoT device and a schedule to perform the second data transaction. The user device performs the second data transaction according to the schedule after obtaining approval.

15 Claims, 3 Drawing Sheets

(56) References Cited

U.S. PATENT DOCUMENTS

| | | | |
|---|---|---|---|
| 10,083,599 B2 | 9/2018 | Sager et al. | |
| 10,119,714 B2 | 11/2018 | Amer et al. | |
| 10,171,462 B2 | 1/2019 | Britt et al. | |
| 10,198,257 B2 | 2/2019 | Enns et al. | |
| 10,380,852 B2 | 8/2019 | Horling | |
| 10,412,171 B2 | 9/2019 | Haleem et al. | |
| 10,423,135 B2 | 9/2019 | Fadell et al. | |
| 10,540,864 B2 | 1/2020 | Sloo et al. | |
| 10,559,192 B2 | 2/2020 | Boettcher et al. | |
| 10,571,877 B2 | 2/2020 | Mathews et al. | |
| 10,638,292 B2 | 4/2020 | Karp et al. | |
| 10,677,484 B2 | 6/2020 | Ribbich et al. | |
| 10,678,200 B2 | 6/2020 | Matsuoka et al. | |
| 10,697,662 B2 | 6/2020 | Matsuoka et al. | |
| 10,764,128 B2 | 9/2020 | Kozura et al. | |
| 10,768,784 B2 | 9/2020 | Shearer et al. | |
| 10,798,804 B2 | 10/2020 | Fadell et al. | |
| 10,831,350 B1* | 11/2020 | de Guia | H04L 12/2803 |
| 10,873,632 B2 | 12/2020 | Mighdoll et al. | |
| 10,977,907 B1 | 4/2021 | Zalewski et al. | |
| 10,990,894 B2* | 4/2021 | Shaashua | G06F 16/35 |
| 11,049,162 B2* | 6/2021 | Balasubramanian | G06Q 30/0625 |
| 2009/0287813 A1* | 11/2009 | Yibin | H04L 41/12 709/224 |
| 2012/0331564 A1* | 12/2012 | Enoki | G06F 21/6254 726/26 |
| 2015/0019710 A1* | 1/2015 | Shaashua | G06F 16/35 709/224 |
| 2015/0019714 A1* | 1/2015 | Shaashua | H04W 4/023 709/224 |
| 2015/0109104 A1* | 4/2015 | Fadell | G08B 27/005 340/5.7 |
| 2016/0123619 A1* | 5/2016 | Hester | H04L 12/2803 700/276 |
| 2016/0189109 A1* | 6/2016 | Le | H04L 67/306 705/7.19 |
| 2016/0242137 A1 | 8/2016 | Benoit et al. | |
| 2016/0342906 A1* | 11/2016 | Shaashua | H04L 67/306 |
| 2017/0193797 A1* | 7/2017 | Gschwind | H04W 4/02 |
| 2018/0208448 A1* | 7/2018 | Zimmerman | G06K 7/1413 |
| 2019/0058985 A1 | 2/2019 | Karp et al. | |
| 2019/0199549 A1* | 6/2019 | Park | H04L 12/2816 |
| 2019/0205839 A1* | 7/2019 | Dotan-Cohen | H04L 67/535 |
| 2020/0092396 A1* | 3/2020 | Wu | H04W 72/121 |
| 2020/0118081 A1* | 4/2020 | Suganuma | G06V 20/64 |
| 2020/0381098 A1* | 12/2020 | Edwards | G16H 40/67 |
| 2021/0010315 A1* | 1/2021 | Honjo | G07C 9/37 |
| 2021/0103994 A1* | 4/2021 | Kohli | G06Q 40/125 |
| 2021/0350279 A1* | 11/2021 | Shaashua | G06F 16/35 |
| 2022/0067669 A1* | 3/2022 | Griffin | G16Y 40/20 |
| 2022/0157143 A1* | 5/2022 | Panneer Selvam | G04G 9/007 |
| 2022/0230753 A1* | 7/2022 | Zweig | G16H 40/20 |
| 2022/0394033 A1* | 12/2022 | Akkapeddi | H04L 63/10 |

FOREIGN PATENT DOCUMENTS

| | | |
|---|---|---|
| CN | 106211022 A | 12/2016 |
| CN | 107683601 B | 5/2019 |
| CN | 110024352 A | 7/2019 |
| CN | 106067834 B | 9/2020 |
| EP | 3232310 A1 | 10/2017 |
| EP | 2976856 B1 | 8/2019 |
| EP | 3241200 B1 | 3/2020 |
| EP | 3208700 B1 | 4/2020 |
| JP | 2016045964 A | 4/2016 |
| JP | 2018129852 A | 8/2018 |
| KR | 102186012 B1 | 12/2020 |
| WO | 2016058366 A1 | 4/2016 |

* cited by examiner

DATA PROCESSING FOR INTERNET OF THINGS (IOT) DEVICES BASED ON RECORDED USER BEHAVIOR

TECHNICAL FIELD

The present disclosure relates generally to data processing, and more specifically to data processing for Internet of Things (IoT) devices based on recorded user behavior.

BACKGROUND

Internet of Things (IoT) describes a network of physical objects (or "things") that are embedded with sensors, software, and other technologies for the purpose of connecting and exchanging data with other devices and systems over the internet. These devices range from ordinary household devices to sophisticated industrial tools. For example, in the consumer market, IoT technology is most synonymous with products pertaining to the concept of the "smart home", including devices and appliances such as lighting fixtures, smart plugs, smart thermostats, home security systems, smart locks, smart irrigation controllers, home energy monitors, wireless smart vents, HVAC systems, refrigerators, coffee machines and the like. As the network of interconnected IoT devices grows in a home or commercial environment, monitoring and maintenance of these devices becomes a challenge. Many of these devices require regular maintenance for continued and reliable operation in accordance with desired performance parameters. However, the IoT industry does not offer an easy solution to manage maintenance tasks related to IoT devices running in an environment. Another challenge related to IoT devices is network security. For example, when a shared printer is low on ink, it can order replacement supplies by itself before affecting anyone's workflow or printing experience. But this same printer can pose a major cybersecurity risk to the network it connects to. IoT networks handle vast amounts of sensitive data and customer information, which makes security a priority. Each new IoT device presents a new potential entry point for network intruders and any compromised device can leave an entire network vulnerable.

SUMMARY

The system and methods implemented by the system as disclosed in the present disclosure provide technical solutions to the technical problems discussed above by automatically determining and performing maintenance operations related to an IoT device. The disclosed system and methods provide several practical applications and technical advantages. For example, the disclosed system provides the practical application of automatically performing maintenance operations related to an IoT device. As described in the following disclosure, a user device detects data transactions relating to maintenance of an IoT device performed using the user device and records the data transactions as a behavior. The user device determines based on the recorded behavior subsequent maintenance transactions that can be performed for the IoT device and a schedule for performing the subsequent maintenance operations. The user device may automatically perform the subsequent maintenance transactions according to the determined schedule. This helps continued and reliable operation of the IoT device in accordance with desired performance parameters.

The disclosed system provides an additional practical application of securing data transactions relating to the IoT device so that unauthorized access to a network via the IoT device is avoided. As described in the following disclosure, a user device may be configured to authenticate a data transaction relating to the IoT device performed using the user device. To authenticate a data transaction, the user device may verify an identity of the user requesting the data transaction using the user device, so that an unauthorized user cannot initiate the data transaction and potentially gain access to the network via the IoT device.

The disclosed system provides an additional practical application of improving performance of an IoT device. As described in the following disclosure, a user device may identify patterns in maintenance related data transactions performed using the user device and automatically determine based on the identified patterns subsequent maintenance operations and corresponding schedules for performing the subsequent maintenance operations for the IoT device. The user device may automatically perform the subsequent maintenance operations according to the determined schedule. By automatically performing maintenance related operations related to the IoT device, the disclosed system and methods improve the performance of the IoT device and help continued and reliable operation of the IoT device in accordance with desired performance parameters. Thus, the disclosed system and methods improve IoT related technology.

In one or more embodiments, a user device is configured to receive a request to connect an Internet of Things (IoT) device to the user device and in response, connect the user device to the IoT device using an electronic communication interface of the user device. The user device is configured to detect that the user device performed a first data transaction relating to the IoT device and record the first data transaction as a behavior. The user device is further configured to determine a second data transaction relating to the IoT device to be performed based on the recorded behavior and determine a schedule according to which the second data transaction is to be performed based on the recorded behavior. The user device is configured to request approval to perform the determined second data transaction according to the determined schedule, receive the approval, and perform the second data transaction according to the determined schedule, in response to receiving the approval.

In one or more embodiments, a user device is configured to detect that a first data transaction was performed by the user device, detect that the first data transaction was performed at a known location, and record the performance of the first data transaction at the determined known location as a behavior. The user device is further configured to detect subsequently that the user device is at the known location and recommend performing a second data transaction at the known location, based on the recorded behavior. The user device is configured to receive approval to perform the second data transaction at the known location and perform the second data transaction at the known location in response to receiving the approval.

Certain aspects of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

System Overview

Figure 1:
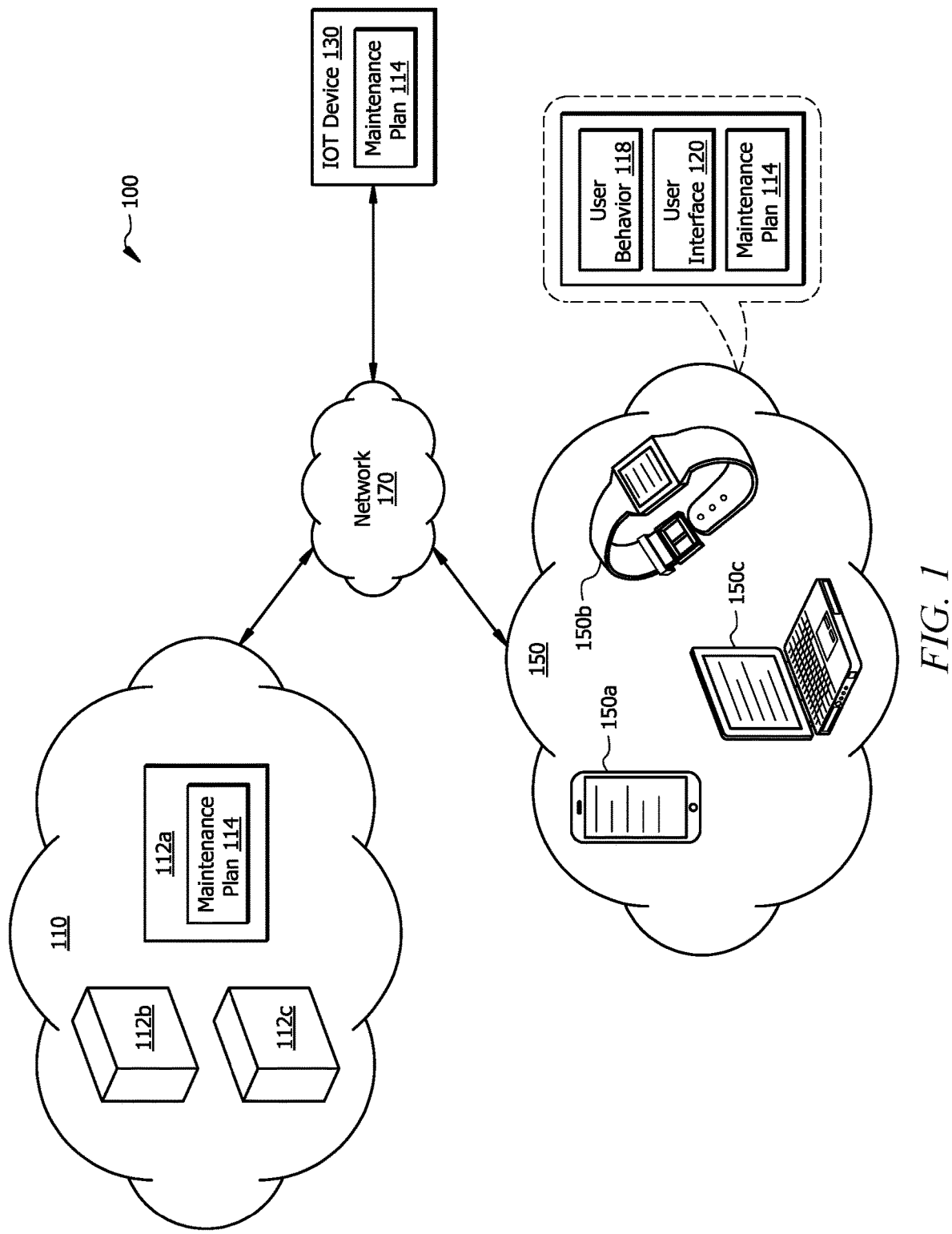
FIG. 1 is a schematic diagram of an example data processing system, in accordance with certain embodiments of the present disclosure.

FIG. 1 is a schematic diagram of an example data processing system 100, in accordance with certain embodiments of the present disclosure.

As shown in FIG. 1, data processing system 100 may include a computing infrastructure 110, an IoT device 130 and a user device 150, each connected to a network 170. The network 170, in general, may be a wide area network (WAN), a personal area network (PAN), a cellular network, or any other technology that allows devices to communicate electronically with other devices. In one or more embodiments, the network 170 may be the Internet.

Computing infrastructure 110 may include one or more service processors shown as 112a-112c). Each of the service processors 112a-112c may be configured to provide one or more data processing services related to the IoT device 130. For example, a service processor 112a can be configured to provide one or more maintenance related services to maintain continued and reliable operation of the IoT device 130. The one or more maintenance services may include, but are not limited to, providing software updates, remote monitoring of device performance, processing orders for spare parts and other maintenance related items (e.g., water filters, air filters, ink cartridges, replacement bulbs and lamps, AC refrigerant, etc.), processing orders for servicing the IoT device 130 by a maintenance personnel (e.g., AC tune up or repair) and billing services.

User device 150 may include any device (shown as devices 150a, 150b and 150c) that has a communication interface for communicating with IoT device 130 and service processors 112a-112c. User device 150 may additionally include a user interface 120 including for example, a display and a user input means (e.g., keypad, touch screen etc.), to allow user interaction with the user device 150. For example, the user device 150 may include, but is not limited to, one or more of a wearable computing device (e.g., a smart watch), a portable computing device (e.g., smartphone, tablet computer etc.), a laptop computer, a desktop computer and the like. User device 150 may communicate with IoT device 130 and each of the service processors 112a-112c over the network 170 using any known wired or wireless technology.

As described above, IoT device 130 can include ordinary household devices to sophisticated industrial tools. For example, in relation to a home environment, IoT device 130 may include, but is not limited to, devices and appliances such as lighting fixtures, smart plugs, smart thermostats, home security systems, smart locks, smart irrigation controllers, home energy monitors, wireless smart vents, HVAC systems, refrigerators, coffee machines and smart printers. IoT device 130 may be embedded with sensors, software, and other technologies for the purpose of connecting and exchanging data with other devices and systems over the internet. For example, IoT device 130 may include one or more sensors to measure one or more parameters related to performance of the IoT device. It may be noted that, while a single IoT device 130 is illustrated in FIG. 1 for ease of illustration, data processing system 100 may include a plurality of IoT devices each capable of functioning in accordance with one or more embodiments of this disclosure.

In one or more embodiments, each of the user device 150, IoT device 130 and service processors 112a-112c may be implemented by a computing device running one or more software applications. For example, one or more of the user device 150, IoT device 130 and service processors 112a-112c may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the user device 150, IoT device 130 and service processors 112a-112c may be representative of a server running one or more software applications to implement respective functionality as described below. In certain embodiments, one or more of the user device 150, IoT device 130 and service processors 112a-112c may run a thin client software application where the processing is directed by the thin client but largely performed by a central entity such as a server (not shown).

User device 150 may be configured to connect to IoT device 130 using a wired connection or wirelessly using an electronic communication interface of the user device 150. For example, the communication interface of the user device 150 may support one or more wireless communication technologies including Wi-Fi and Bluetooth. In one embodiment, user device 150 may wirelessly connect to and communicate with IoT device 130 over network 170 using the Wi-Fi protocol. In this case, network 170 may include a local area network (LAN) within a home environment that connects to the internet.

In one or more embodiments, a user of the user device 150 may interact with the user interface 120 of the user device 150 to connect to the IoT device 130. For example, user device 150 may be configured to receive a "request to connect" via the user interface 120 of the user device. In response to receiving the request to connect, user device 150 may be configured to search for IoT devices (e.g., IoT device 130) connected to network 170. User device 150 may detect IoT device 130 as a result of searching network 170 and may present information (e.g., network name of IoT device 130) relating to the detected IoT device 130 via the user interface 120. For example, the network name of the IoT device 130 may be displayed on a display of the user device 150. Using the user interface 120, the user may select the IoT device 130 for connecting to the user device 150. In response to receiving the selection of the IoT device 130 via the user interface 120, user device 150 may connect to the IoT device 130, for example, using a preferred communication protocol (e.g., Wi-Fi protocol). The user device 150 may receive a selection of the preferred communication protocol via the user interface 120. Once connected to the IoT device 130, user device 150 may be configured to store the IoT device 130 as a registered device of the user device 150. Registration of the IoT device 130 at the user device 150 may include storing a network name and/or Internet Protocol (IP) address of the IoT device 130 in a list of registered devices maintained by the user device 150.

In an alternative or additional embodiment, when IoT device 130 is connected to network 170, user device 150, when already connected to network 170, may be configured to detect the connection of IoT device 130 to network 170. Upon detecting the connection of the IoT device 130 to network 170, user device 150 checks whether the IoT device 130 is already registered at the user device 150. For example, user device 150 may search a list of registered devices (e.g., locally stored at the user device 150) based on a unique identifier (e.g., network name) of the IoT device 130. Upon determining that the IoT device 130 is not registered, user device 150 may be configured to prompt the user via the user interface 120 to connect the newly detected IoT device 130 to the user device 150. Upon receiving approval to connect via the user interface 120, user device 150 may connect to the IoT device 130, for example, using a preferred communication protocol (e.g., Wi-Fi protocol). Once connected to the IoT device 130, user device 150 may be configured to store the IoT device 130 as a registered device of the user device 150.

User device 150 may be configured to perform one or more data transactions related to IoT device 130. The data transactions may relate to maintenance operations or other operations related to the IoT device 130. For example, the user device 150 may perform one or more data transactions that relate to corresponding maintenance operations for the IoT device 130 including, but not limited to, obtaining and installing software updates at the IoT device 130, monitoring of device performance parameters related to the IoT device 130, processing orders for spare parts and other maintenance related items (e.g., water filters, air filters, ink cartridges, replacement bulbs and lamps, air conditioner (AC) refrigerant, etc.) for the IoT device 130, and processing orders for servicing the IoT device 130 by a maintenance personnel (e.g., AC tune up or repair). An example of other operations related to the IoT device 130 may include billing services. For example, when the IoT device 130 includes a smart power meter, user device 150 may perform data transactions relating to obtaining billing statements for used power and for processing payments in relation to the obtained bills.

In one or more embodiments, a user of the user device 150 may initiate data transactions related to the IoT device 130 using the user interface 120 of the user device 150. For example, the user may search for software updates and initiate installs of software updates for the IoT device 130 using the user interface 120 of the user device 150. In this case, the data transactions performed by the user device 150 may include receiving a request for software updates via the user interface 120, transmitting a query to a service processor 112a to check for available software updates, and coordinating an install of a software update at the IoT device 130. In another example, when the IoT device 130 connected to user device 150 (e.g., via network 170) includes a Heating, Ventilation and Air Conditioning (HVAC) system, the user may process a data transaction relating to ordering air filters for the HVAC system using the user interface 120 of the user device 150. In this case the data transaction performed by the user device 150 may include data processing relating to processing the order such as receiving a request for the order via the user interface 120, generating a digital purchase request, transmitting the purchase request to a service processor 112a (e.g., belonging to a seller of air filters), and receiving confirmation for the order.

User device 150 may be configured to record as a user behavior 118 one or more data transactions performed using user device 150. The recorded user behavior 118 may be stored locally in a memory of the user device 150. The user behavior 118 may include information relating to the corresponding data transaction performed by the user device 150 including, but not limited to, a type of the data transaction, a time of performing the data transaction (e.g., including date, day and time of the transaction), a number of times the data transaction was processed by the user device 150 and a service processor 112a used for processing the data transaction.

For example, when the user initiates and processes a software update install for the IoT device 130 using the user device 150, user device 150 may record and store the data transaction as a user behavior 118. In this case the recorded user behavior 118 may include performing a software update transaction as the type of transaction and a time (e.g., including date, day and time) of performing the software update transaction. In another example, when the user initiates and processes an order for an air filter for an HVAC system using the user device 150, user device 150 records and stores the data transaction as a user behavior 118. In this case the recorded user behavior 118 may include ordering air filters as the type of transaction and a time (e.g., including date, day and time) of processing the transaction. In certain cases, user device 150 may record a data transaction as a user behavior 118 upon obtaining approval from the user. For example, upon detecting that a data transaction relating to the IoT device 130 has been performed using the user device 150, user device 150 requests approval (e.g., via the user interface 120 of the user device 150) to record a user behavior 118 corresponding to the data transaction. User device 150 records the user behavior 118, upon receiving approval (e.g., via the user interface 120).

User device 150 may be configured to determine one or more subsequent data transactions that can be performed by the user device 150 in relation to the IoT device 130 and a schedule for performing the subsequent data transactions, based on a user behavior 118 recorded for the IoT device 130. For example, when the user device 150 records processing of a software update for the IoT device 130, user device 150 may determine that the IoT device 130 may need another software update sometime in the future and/or regular software updates according to a schedule.

The user device 150 may obtain a schedule for performing subsequent data transaction(s) in several ways. In one embodiment, when a data transaction relating to IoT device 130 is performed by the user device 150, user device 150 records the data transaction as a user behavior 118 as described above and determines a subsequent data transaction that can be performed relating to the IoT device 130 based on the recorded user behavior 118. User device 150 may be configured to request a schedule for performing the subsequent transaction. For example, user device 150 may prompt the user via the user interface 120 to provide a schedule for performing the subsequent data transaction relating to the IoT device 130. The schedule for performing the subsequent data transaction may include a time (e.g., including date and time) for performing a single instance of the subsequent data transaction or a plan for performing several instances of the subsequent data transaction. In response, the user may provide a schedule for performing the subsequent data transaction, for example, via the user interface 120. User device 150 may store the obtained schedule and perform the subsequent data transaction in accordance with the schedule. In an example use case, when user device 150 detects that the user device 150 was used to download a software update for the IoT device 130 from a service processor 112a and to trigger install of the downloaded software update at the IoT device 130, user device 150 records the software update as a user behavior 118. Based on the recorded user behavior 118, user device 150 recommends via the user interface 120 that one or more subsequent software updates may be scheduled for the IoT device 130. In this case, a subsequent software update corresponds to the subsequent data transaction discussed above. In response to the recommendation, user device 150 may receive via the user interface 120 a schedule for performing future software updates for the IoT device 130. User device 150 may perform subsequent software updates for the IoT device 130 based on the received schedule.

In an additional or alternative embodiment, user device 150 may determine a subsequent data transaction related to the IoT device 130 as well as a schedule for performing the subsequent data transaction based on the recorded user behavior 118. User device 150 may be configured to record a data transaction performed by the user device 150 as a user behavior 118 when multiple instances of the data transaction are performed a pre-configured minimum number of times in a repeatable pattern. The minimum number of times a data transaction needs to be performed to qualify for recording as a user behavior 118 can be set such that a pattern of user behavior 118 can be recognized from the instances of the data transaction. Additionally or alternatively, user device 150 may not record the data transaction as a user behavior 118 until a recognizable pattern of performing multiple instances of the data transaction can be identified. Staying with the software update example use case, when the user device 150 is used to perform several software updates for the IoT device 130 periodically at regular or substantially regular time intervals (e.g., every month), user device 150 records the performance of the software update every month as a user behavior. Based on the recorded user behavior, user device 150 may recommend via the user interface 120 that subsequent software updates be scheduled every month. Upon receiving approval of the recommendation (e.g., via the user interface 120), user device 150 may perform regular software updates for the IoT device 130 every month.

User device 150 may be configured to determine a maintenance plan 114 of the IoT device 130 based on the type of the IoT device 130. In response to connecting to the IoT device 130 and/or any time after connecting to the IoT device 130, user device 150 may obtain a maintenance plan 114 for the IoT device 130. The maintenance plan 114 of the IoT device 130 may include one or more maintenance related operations that can be performed for the IoT device 130 and a corresponding schedule for performing each of the maintenance operations. The maintenance operations may include, but are not limited to, providing software updates, remote monitoring of device performance, processing orders for spare parts and other maintenance related items (e.g., water filters, air filters, ink cartridges, replacement bulbs and lamps, AC refrigerant, etc.), processing orders for servicing the IoT device 130 by a maintenance personnel (e.g., AC tune up or repair) and obtaining and processing billing for the device.

User device 150 may obtain the maintenance plan 114 of the IoT device 130 in several ways. In one embodiment, user device 150 may store in a local memory of the user device 150 a plurality of maintenance plans 114 for several IoT devices 130 that can be connected to user device 150. After connecting to the IoT device 130, user device 150 may be configured to search the local memory for the specific maintenance plan 114 of the IoT device 130 based on the type of the IoT device 130. The type of the IoT device may include, but is not limited to, device type (e.g., smart power meter, smart thermostat, home security system, smart lock, smart irrigation controller etc.), a model number of the device, a manufacturer of the device and a year of manufacture. User device may perform one or more maintenance operations related to the IoT device 130 based on the obtained maintenance plan 114 of the IoT device 130.

In an additional or alternative embodiment, user device 150 may request the IoT device 130 to transmit the maintenance plan 114 to the user device 150. For example, upon connecting to the IoT device 130, user device 150 may transmit a request to the IoT device 130 for the maintenance plan 114 of the IoT device 130. In response, IoT device 130 may transmit the maintenance plan 114 to the user device 150. Upon receiving the maintenance plan 114, user device 150 may be configured to perform one or more maintenance operations related to the IoT device 130 based on the obtained maintenance plan 114 of the IoT device 130.

In an additional or alternative embodiment, user device 150 may request a service processor 112a to transmit the maintenance plan 114 to the user device 150. For example, upon connecting to the IoT device 130, user device 150 may transmit a request to the service processor 112a for the maintenance plan 114 of the IoT device 130. Service processor 112 may store a plurality of maintenance plans 114 relating to several IoT devices 130. The request transmitted to the service processor 112a may include information relating to the IoT device 130 including, but not limited to device type (e.g., smart power meter, smart thermostat, home security system, smart lock, smart irrigation controller etc.), a model number of the device, a manufacturer of the device and a year of manufacture. Service processor 112a may be configured to search for the specific maintenance plan of the IoT device 130 based on the information relating to the IoT device 130 included in the request. Service processor 112a may transmit the maintenance plan 114 to the user device 150. Upon receiving the maintenance plan 114, user device 150 may be configured to perform one or more maintenance operations related to the IoT device 130 based on the obtained maintenance plan 114 of the IoT device 130.

User device 150 may be configured to update the maintenance plan 114 of the IoT device 130 at regular intervals. For example, user device 150 may be configured to request and receive a latest maintenance plan 114 of the IoT device 130 from the IoT device 130 and/or service processor 112a after pre-configured time intervals.

In some cases, user device 150 may be configured to authenticate a data transaction relating to the IoT device 130 (including subsequent data transactions performed according to an obtained schedule as described above) performed using the user device 150. To authenticate a data transaction, the user device 150 may be configured to verify an identify of the user requesting the data transaction using the user device 150, so that an authorized user can initiate the data transaction. For example, user device 150 verifies that the user requesting the data transaction using the user device 150 is the owner of the user device. To accomplish the verifying, user device 150 may be configured to prompt the user to provide a unique personal identifier of the user via the user interface 120. In response, user device 150 may receive the unique personal identifier of the user via the user interface 120. The unique personal identifier of the user may include, but is not limited to, a personal identification number (PIN), a government ID card number, driving license number, user biometrics data (e.g., fingerprints, face recognition pattern, etc.), voice pattern and combinations thereof. A pre-authorized unique personal identifier of the user may be stored locally at the user device 150. In this case, the user device 150 may compare the received personal identifier to the stored pre-authorized personal identifier of the user. User device 150 may determine that the data transaction is successfully authenticated in response to a successful match between the received and pre-authorized personal identifiers.

User device 150 may be configured to request approval for performing a data transaction relating to the IoT device 130 including subsequent data transactions performed according to an obtained schedule as described above. For example, user device 150 may be configured to request and obtain approval of a maintenance plan 114 of the IoT device 130 obtained from IoT device 130, service processor 112a and/or local memory of user device 150, before proceeding to perform maintenance operations according to the obtained maintenance plan 114. In one embodiment, the user device 150 may be configured to request and obtain approval before performing each instance of a subsequent data transaction performed by the user device 150.

In one or more embodiments, user device 150 may be configured to record as user behavior 118 data transactions performed using the user device 150 at known geographic locations. For example, when a user processes a purchase data transaction at a known retail outlet, user device 150 records the purchase transaction performed at the known retail outlet as a user behavior 118. In this case, the recorded user behavior 118 may include a type of the data transaction and a geo-location of the user device 150 at the time the data transaction was processed by the user device 150. User device 150 may have the capability and be configured to detect a geo-location of the user device 150. User device 150 may be configured to determine a subsequent data transaction that can be performed by the user device 150 based on the recorded user behavior. For example, after recording a data transaction at a known location as a user behavior 118, user device 150 may be configured to detect when the user is in the vicinity of the recorded known location at a later time. For example, the user device 150 tracks the geo-location of the user device 150 and detects when the geo-location of the user device 150 matches with the stored geo-location of the known location. Upon detecting that the user is in the vicinity of the known location, user device 150 may be configured to recommend that the user perform the same or similar data transaction as the previously recorded data transaction at the known location. For example, when the recorded user behavior includes performing a purchase transaction at a retail outlet, when the user device 150 detects that the user device 150 is in the vicinity of the same retail outlet at a later time, user device 150 may recommend that the user perform the same purchase transaction or a similar purchase transaction at the retail outlet. In an embodiment, the user device 150 recommends subsequent data transactions based on recorded user behavior 118 when the user is in the vicinity of the recorded location a pre-configured minimum time after the original data transaction was recorded at the same location. The minimum time may be selected by the user.

In an example use case, when the user device 150 is used to process a data transaction relating to searching for and buying tickets at an arena, user device 150 records the purchase of tickets at the arena as a user behavior 118. The next time user device 150 detects that the user device 150, and thus the user, is in the vicinity of the same arena, user device 150 recommends via the user interface 120 purchase of tickets at the arena. Subsequently, the user may search for desired tickets using the user interface 120 and select tickets for purchase. Upon receiving the selection of tickets, user device 150 may process a purchase transaction relating to buying the tickets.

In some cases, the user device 150 may be configured to provide a list of data transactions that can be performed by the user device 150 at the recorded known location. For example, when the recorded behavior 118 includes a garment purchase at retail outlet, the user device 150 may provide a list of garments that can be purchased at the retail outlet upon detecting that the user device 150 is at the same retail outlet at a later date. When the user device 150 detects that the user device 150 is in the vicinity of the previously recorded location, user device 150 may search for products and/or services supported at the location. For example, the user device 150 may transmit a query to a service processor 112a to request the list of products and services supported at the location. The user device 150 may receive the list from the service processor 112a in response to the query. Upon obtaining the list, user device 150 may present the list to the user via the user interface 120. The user device 150 may receive a selection of one or more items from the list and process data transactions to order the selected items.

Figure 2:
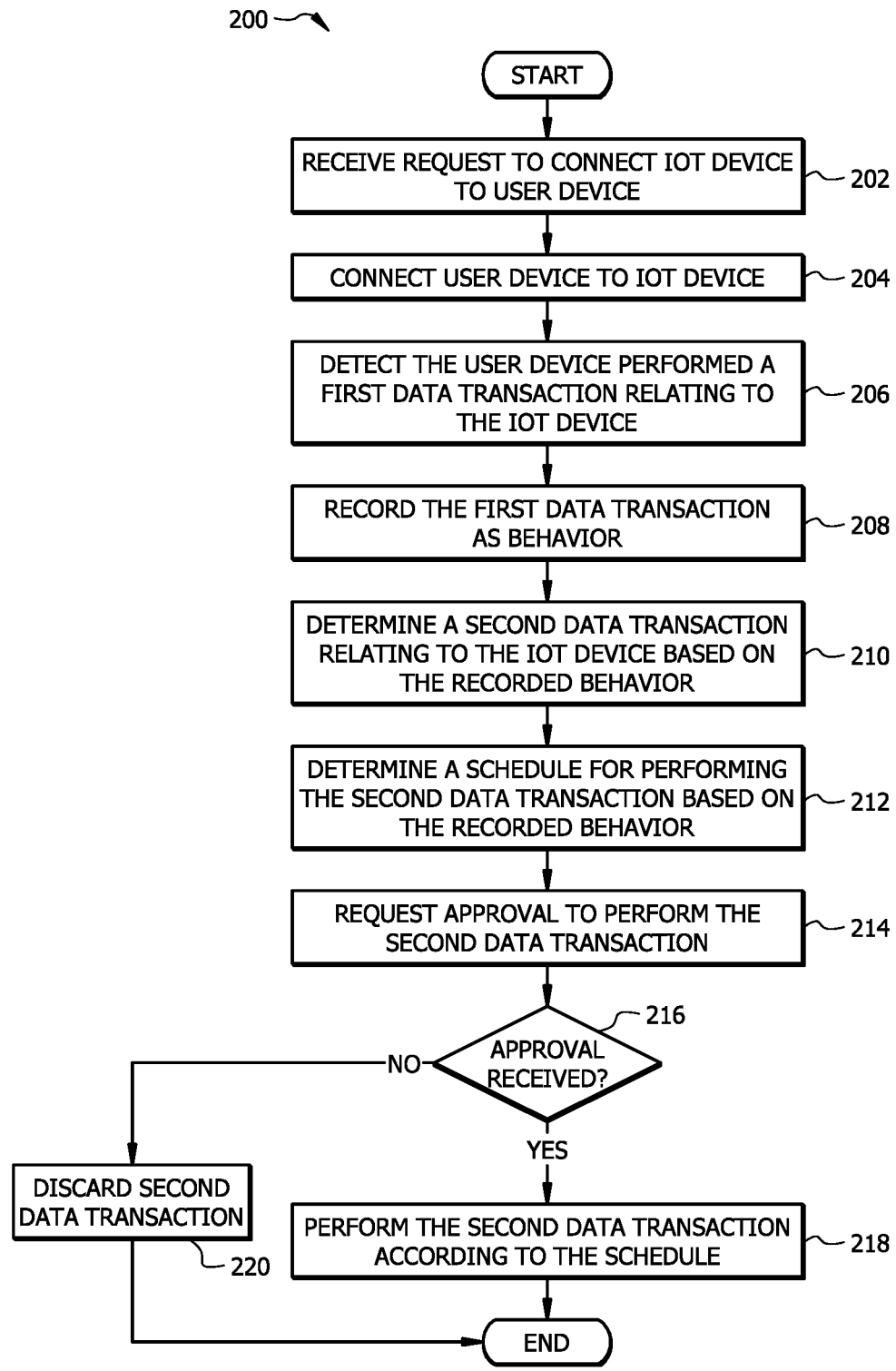
FIG. 2 is a flowchart of an example method for performing data transactions based on recorded behavior, in accordance with certain embodiments of the present disclosure.

FIG. 2 is a flowchart of an example method 200 for performing data transactions based on recorded behavior, in accordance with certain embodiments of the present disclosure. Method 200 may be performed by the user device 150 as shown in FIG. 1 and described above.

At step 202, user device 150 receives a request to connect to an IoT device 130 to the user device 150.

User device 150 may include any device (shown as devices 150a, 150b and 150c) that has a communication interface for communicating with IoT device 130 and service processors 112a-112c. User device 150 may additionally include a user interface 120 including for example, a display and a user input means (e.g., keypad, touch screen etc.), to allow user interaction with the user device 150. For example, the user device 150 may include, but is not limited to, one or more of a wearable computing device (e.g., a smart watch), a portable computing device (e.g., smartphone, tablet computer etc.), a laptop computer, a desktop computer and the like.

IoT device 130 can include ordinary household devices to sophisticated industrial tools. For example, in relation to a home environment, IoT device 130 may include, but is not limited to, devices and appliances such as lighting fixtures, smart plugs, smart thermostats, home security systems, smart locks, smart irrigation controllers, home energy monitors, wireless smart vents, HVAC systems, refrigerators, coffee machines and smart printers. IoT device 130 may be embedded with sensors, software, and other technologies for the purpose of connecting and exchanging data with other devices and systems over the internet. For example, IoT device 130 may include one or more sensors to measure one or more parameters related to performance of the IoT device.

At step 204, in response to receiving the request to connect at step 202, user device 150 connects to the IoT device 130 using an electronic communication interface of the user device 150.

As described above, user device 150 may be configured to connect to IoT device 130 using a wired connection or wirelessly using an electronic communication interface of the user device 150. For example, the communication interface of the user device 150 may support one or more wireless communication technologies including Wi-Fi and Bluetooth. In one embodiment, user device 150 may wirelessly connect to and communicate with IoT device 130 over network 170 using the Wi-Fi protocol. In this case, network 170 may include a local area network (LAN) within a home environment that connects to the internet.

In one or more embodiments, a user of the user device 150 may interact with the user interface 120 of the user device 150 to connect to the IoT device 130. For example, user device 150 may receive a "request to connect" via the user interface 120 of the user device. In response to receiving the request to connect, user device 150 may search for IoT devices (e.g., IoT device 130) connected to network 170. User device 150 may detect IoT device 130 as a result of searching network 170 and may present information (e.g., network name of IoT device 130) relating to the detected IoT device 130 via the user interface 120. For example, the network name of the IoT device 130 may be displayed on a display of the user device 150. Using the user interface 120, the user may select the IoT device 130 for connecting to the user device 150. In response to receiving the selection of the IoT device 130 via the user interface 120, user device 150 may connect to the IoT device 130, for example, using a preferred communication protocol (e.g., Wi-Fi protocol). The user device 150 may receive a selection of the preferred communication protocol via the user interface 120. Once connected to the IoT device 130, user device 150 may be configured to store the IoT device 130 as a registered device of the user device 150. Registration of the IoT device 130 at the user device 150 may include storing a network name and/or Internet Protocol (IP) address of the IoT device 130 in a list of registered devices maintained by the user device 150.

In an alternative or additional embodiment, when IoT device 130 is connected to network 170, user device 150, when already connected to network 170, may detect the connection of IoT device 130 to network 170. Upon detecting the connection of the IoT device 130 to network 170, user device 150 checks whether the IoT device 130 is already registered at the user device 150. For example, user device 150 may search a list of registered devices (e.g., locally stored at the user device 150) based on a unique identifier (e.g., network name) of the IoT device 130. Upon determining that the IoT device 130 is not registered, user device 150 may prompt the user via the user interface 120 to connect the newly detected IoT device 130 to the user device 150. Upon receiving approval to connect (or request to connect) via the user interface 120, user device 150 may connect to the IoT device 130, for example, using a preferred communication protocol (e.g., Wi-Fi protocol). Once connected to the IoT device 130, user device 150 may be configured to store the IoT device 130 as a registered device of the user device 150. User device 150 may communicate with IoT device 130 and each of the service processors 112*a*-112*c* over the network 170 using any known wired or wireless technology.

At step 206, user device 150 detects that the user device 150 performed a first data transaction relating to the IoT device 130.

The first data transaction may relate to a maintenance operation or other operation related to the IoT device 130. For example, the user device 150 may be configured to perform one or more data transactions that relate to corresponding maintenance operations for the IoT device 130 including, but not limited to, obtaining and installing software updates at the IoT device 130, monitoring of device performance parameters related to the IoT device 130, processing orders for spare parts and other maintenance related items (e.g., water filters, air filters, ink cartridges, replacement bulbs and lamps, air conditioner (AC) refrigerant, etc.) for the IoT device 130, and processing orders for servicing the IoT device 130 by a maintenance personnel (e.g., AC tune up or repair). An example of other operation related to the IoT device 130 may include a billing operation. For example, when the IoT device 130 includes a smart power meter, user device 150 may perform a data transaction relating to obtaining billing statements for used power and/or for processing payments in relation to the obtained bills.

In one or more embodiments, a user of the user device 150 may initiate the first data transaction related to the IoT device 130 using the user interface 120 of the user device 150. For example, the user may search for software updates and initiate installs of software updates for the IoT device 130 using the user interface 120 of the user device 150. In this case, the first data transaction performed by the user device 150 may include receiving a request for software updates via the user interface 120, transmitting a query to a service processor 112*a* to check for available software updates, and coordinating an install of a software update at the IoT device 130. In another example, when the IoT device 130 connected to user device 150 (e.g., via network 170) includes a Heating, Ventilation and Air Conditioning (HVAC) system, the user may process a data transaction relating to ordering air filters for the HVAC system using the user interface 120 of the user device 150. In this case the first data transaction performed by the user device 150 may include data processing relating to processing the order such as receiving a request for the order via the user interface 120, generating a digital purchase request, transmitting the purchase request to a service processor 112*a* (e.g., belonging to a seller of air filters), and receiving confirmation for the order.

At step 208, user device records the first data transaction as a behavior (e.g., user behavior 118 shown in FIG. 1).

As described above user device 150 may be configured to record as a user behavior 118 one or more data transactions performed using user device 150. The recorded user behavior 118 may be stored locally in a memory of the user device 150. The user behavior 118 may include information relating to the corresponding first data transaction performed by the user device 150 including, but not limited to, a type of the data transaction, a time of performing the data transaction (e.g., including date, day and time of the transaction), a number of times the data transaction was processed by the user device 150 and a service processor 112*a* used for processing the data transaction.

For example, when the user initiates and processes a software update install for the IoT device 130 using the user device 150, user device 150 may record and store the data transaction as a user behavior 118. In this case the recorded user behavior 118 may include performing a software update transaction as the type of transaction and a time (e.g., including date, day and time) of performing the software update transaction. In another example, when the user initiates and processes an order for an air filter for an HVAC system using the user device 150, user device 150 records and stores the data transaction as a user behavior 118. In this case the recorded user behavior 118 may include ordering air filters as the type of transaction and a time (e.g., including date, day and time) of processing the transaction. In certain cases, user device 150 may record the first data transaction as user behavior 118 upon obtaining approval from the user. For example, upon detecting that the first data transaction relating to the IoT device 130 has been performed using the user device 150, user device 150 requests approval (e.g., via the user interface 120 of the user device 150) to record a user behavior 118 corresponding to the first data transaction. User device 150 records the user behavior 118, upon receiving approval (e.g., via the user interface 120).

At step 210, user device 150 determines a second data transaction relating to the IoT device that can be performed based on the recorded behavior (e.g., user behavior 118 shown in FIG. 1).

At step 212, user device 150 determines a schedule according to which the second data transaction can be performed based on the recorded behavior (e.g., user behavior 118 shown in FIG. 1).

As described above, user device 150 may be configured to determine a subsequent data transaction that can be performed by the user device 150 in relation to the IoT device 130 and a schedule for performing the subsequent data transaction, based on a user behavior 118 recorded for the IoT device 130. The subsequent data transaction corresponds to the second data transaction of step 212. For example, when the user device 150 records processing of a software update for the IoT device 130, user device 150 may determine that the IoT device 130 may need another software update sometime in the future and/or regular software updates according to a schedule.

The user device 150 may obtain the schedule for performing the subsequent data transaction in several ways. In one embodiment, when the first data transaction relating to IoT device 130 is performed by the user device 150, user device 150 records the first data transaction as a user behavior 118 as described above and determines the subsequent data transaction that can be performed relating to the IoT device 130 based on the recorded user behavior 118. User device 150 may be configured to request a schedule for performing the subsequent data transaction. For example, user device 150 may prompt the user via the user interface 120 to provide the schedule for performing the subsequent data transaction relating to the IoT device 130. The schedule for performing the subsequent data transaction may include a time (e.g., including date and time) for performing a single instance of the subsequent data transaction or a plan for performing several instances of the subsequent data transaction. In response, the user may provide a schedule for performing the subsequent data transaction, for example, via the user interface 120. User device 150 may store the obtained schedule and perform the subsequent data transaction in accordance with the schedule. In an example use case, when user device 150 detects that the user device 150 was used to download a software update for the IoT device 130 from a service processor 112a and to trigger install of the downloaded software update at the IoT device 130, user device 150 records the software update as a user behavior 118. Based on the recorded user behavior 118, user device 150 recommends via the user interface 120 that one or more subsequent software updates may be scheduled for the IoT device 130. In this case, a subsequent software update corresponds to the subsequent data transaction discussed above. In response to the recommendation, user device 150 may receive via the user interface 120 a schedule for performing future software updates for the IoT device 130. User device 150 may perform subsequent software updates for the IoT device 130 based on the received schedule.

In an additional or alternative embodiment, user device 150 may be configured to record the first data transaction performed by the user device 150 as a user behavior 118 when multiple instances of the first data transaction are performed a pre-configured minimum number of times in a repeatable pattern. The minimum number of times the first data transaction needs to be performed to qualify for recording as a user behavior 118 can be set such that a pattern of user behavior 118 can be recognized from the instances of the first data transaction. Additionally or alternatively, user device 150 may not record the first data transaction as a user behavior 118 until a recognizable pattern of performing multiple instances of the first data transaction can be identified. Staying with the software update example use case, when the user device 150 is used to perform several software updates for the IoT device 130 periodically at regular or substantially regular time intervals (e.g., every month), user device 150 records the performance of the software update every month as a user behavior. Based on the recorded user behavior, user device 150 may recommend via the user interface 120 that subsequent software updates be scheduled every month. Upon receiving approval of the recommendation (e.g., via the user interface 120), user device 150 may perform regular software updates for the IoT device 130 every month.

User device 150 may determine a maintenance plan 114 of the IoT device 130 based on the type of the IoT device 130. In response to connecting to the IoT device 130 and/or any time after connecting to the IoT device 130, user device 150 may obtain a maintenance plan 114 for the IoT device 130. The maintenance plan 114 of the IoT device 130 may include one or more maintenance related operations that can be performed for the IoT device 130 and a corresponding schedule for performing each of the maintenance operations. In this case, the act of connecting the user device 150 to the IoT device 130 is recorded as the behavior (e.g., user behavior 118). Any maintenance operation from the maintenance plan 114 may correspond to the second data transaction or subsequent data transaction relating to the IoT device 130. Further, a schedule for performing a maintenance operation from the maintenance plan 114 may correspond to the schedule for performing the second or subsequent data transaction related to the IoT device.

The maintenance operations in the maintenance plan 114 may include, but are not limited to, providing software updates, remote monitoring of device performance, processing orders for spare parts and other maintenance related items (e.g., water filters, air filters, ink cartridges, replacement bulbs and lamps, AC refrigerant, etc.), processing orders for servicing the IoT device 130 by a maintenance personnel (e.g., AC tune up or repair) and obtaining and processing billing for the device.

User device 150 may obtain the maintenance plan 114 of the IoT device 130 in several ways. In one embodiment, user device 150 may store in a local memory of the user device 150 a plurality of maintenance plans 114 for several IoT devices 130 that can be connected to user device 150. After connecting to the IoT device 130, user device 150 may search the local memory for the specific maintenance plan 114 of the IoT device 130 based on the type of the IoT device 130. The type of the IoT device may include, but is not limited to, device type (e.g., smart power meter, smart thermostat, home security system, smart lock, smart irrigation controller etc.), a model number of the device, a manufacturer of the device and a year of manufacture. User device may perform one or more maintenance operations related to the IoT device 130 based on the obtained maintenance plan 114 of the IoT device 130.

In an additional or alternative embodiment, user device 150 may request the IoT device 130 to transmit the maintenance plan 114 to the user device 150. For example, upon connecting to the IoT device 130, user device 150 may transmit a request to the IoT device 130 for the maintenance plan 114 of the IoT device 130. In response, IoT device 130 may transmit the maintenance plan 114 to the user device 150. Upon receiving the maintenance plan 114, user device 150 may be configured to perform one or more maintenance operations related to the IoT device 130 based on the obtained maintenance plan 114 of the IoT device 130.

In an additional or alternative embodiment, user device 150 may request a service processor 112a to transmit the maintenance plan 114 to the user device 150. For example, upon connecting to the IoT device 130, user device 150 may transmit a request to the service processor 112a for the maintenance plan 114 of the IoT device 130. Service processor 112 may store a plurality of maintenance plans 114 relating to several IoT devices 130. The request transmitted to the service processor 112a may include information relating to the IoT device 130 including, but not limited to device type (e.g., smart power meter, smart thermostat, home security system, smart lock, smart irrigation controller etc.), a model number of the device, a manufacturer of the device and a year of manufacture. Service processor 112a may be configured to search for the specific maintenance plan of the IoT device 130 based on the information relating to the IoT device 130 included in the request. Service processor 112a may transmit the maintenance plan 114 to the user device 150. Upon receiving the maintenance plan 114, user device 150 may be configured to perform one or more maintenance operations related to the IoT device 130 based on the obtained maintenance plan 114 of the IoT device 130.

User device 150 may be configured to update the maintenance plan 114 of the IoT device 130 at regular intervals. For example, user device 150 may be configured to request and receive a latest maintenance plan 114 of the IoT device 130 from the IoT device 130 and/or service processor 112a after pre-configured time intervals.

At step 214, user device 150 requests approval to perform the second or subsequent data transaction according to the determined schedule.

As described above, user device 150 may be configured to request approval for performing a data transaction relating to the IoT device 130 including subsequent data transactions performed according to an obtained schedule as described above. For example, user device 150 may be configured to request and obtain approval of a maintenance plan 114 of the IoT device 130 obtained from IoT device 130, service processor 112a and/or local memory of user device 150, before proceeding to perform maintenance operations according to the obtained maintenance plan 114. In one embodiment, the user device 150 may be configured to request and obtain approval before performing each instance of a subsequent data transaction performed by the user device 150.

At step 216, user device checks whether an approval was received (e.g., via user interface 120) for performing the second data transaction. If an approval was not received, method 200 proceeds to step 220 where the second data transaction is discarded. However, if an approved is received to perform the second data transaction according to the determined schedule, method 200 proceeds to step 218 where user device 150 performs the second data transaction according to the determined schedule.

Figure 3:
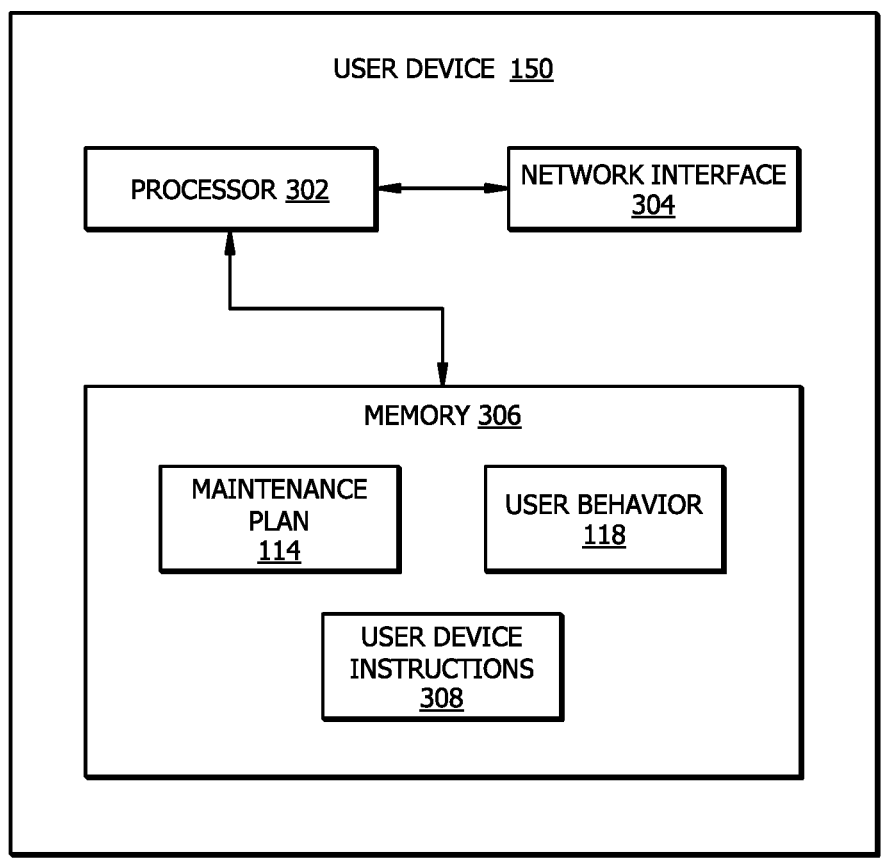
FIG. 3 illustrates an example schematic diagram of the user device illustrated in FIG. 1, in accordance with one or more embodiments of the present disclosure.

FIG. 3 illustrates an example schematic diagram of the user device 150 illustrated in FIG. 1, in accordance with one or more embodiments of the present disclosure.

User device 150 includes a processor 302, a memory 306, and a network interface 304. The User device 150 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., user device instructions 308) to implement the User device 150. In this way, processor 302 may be a special-purpose computer designed to implement the functions disclosed herein. In one or more embodiments, the User device 150 is implemented using logic units, FPGAs, ASICs, DSPs, or any other suitable hardware. The User device 150 is configured to operate as described with reference to FIGS. 1-2. For example, the user device 150 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to user behavior 118, maintenance plan 114 and user device instructions 308. The user device instructions 308 may include any suitable set of instructions, logic, rules, or code operable to execute the user device 150.

The network interface 304 is configured to enable wired and/or wireless communications. The network interface 304 is configured to communicate data between the user device 150 and other devices, systems, or domains (e.g. one or more service processors 112a-112c, IoT device 130 etc.). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that each of the service processors 112a-112c and IoT device 130 may be implemented similar to the user device 150. For example, the each of the service processors 112a-112d and IoT device 130 may include a processor and a memory storing instructions to implement the respective functionality of the service processor 112a-112c and IoT device 130 when executed by the processor. The memory of a service processor 112a may store the maintenance plan 114 of the IoT device 130. Similarly, the memory of the IoT device 130 may also store a copy of the maintenance plan 114 of the IoT device 130.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A user device comprising:
at least one processor configured to:
receive a request to connect an Internet of Things (IOT) device to the user device;
in response, connect the user device to the IoT device using an electronic communication interface of the user device;
detect that the user device performed a first data transaction relating to the IoT device a pre-configured minimum number of times, wherein the first data transaction qualifies for recording as a behavior when performed at least the minimum number of times;
in response to detecting that the first data transaction was performed the minimum number of times, record the first data transaction as a behavior;
determine a second data transaction relating to the IoT device to be performed based on the recorded behavior;
determine a schedule according to which the second data transaction is to be performed based on the recorded behavior;
request approval to perform the determined second data transaction according to the determined schedule;
receive the approval; and
perform the second data transaction according to the determined schedule, in response to receiving the approval; and
a memory coupled to the at least one processor and configured to store the recorded behavior.

2. The user device of claim 1, wherein the at least one processor is further configured to:
determine based on a type of the IoT device a third data transaction relating to the IoT device and a second schedule for performing the third data transaction, wherein the memory stores the third data transaction and the second schedule for performing the third data transaction corresponding to the type of IoT device; and
perform the third data transaction according to the second schedule.

3. The user device of claim 1, wherein the at least one processor is further configured to:
receive from the IoT device information relating to a third data transaction relating to the IoT device and a second schedule for performing the third data transaction; and
perform the third data transaction according to the second schedule.

4. The user device of claim 1, wherein:
the determined schedule comprises performing multiple instances of the second data transaction at respective pre-determined days and times.

5. The user device of claim 1, wherein the at least one processor is configured to record the first data transaction as the behavior in response to detecting that the first data transaction has been performed a pre-configured number of times in a repeatable pattern.

6. The user device of claim 5, wherein the repeatable pattern comprises the first data transaction performed at periodic time intervals.

7. The user device of claim 1, wherein the at least one processor is further configured to:
request, in response to detecting that the user device has performed the first data transaction relating to the IoT device, information relating to a third data transaction relating to the IoT device and a second schedule for performing the third data transaction;
obtain the information relating to the third data transaction relating to the IoT device and the second schedule for performing the third data transaction; and
perform the third data transaction according to the second schedule.

8. The user device of claim 1, wherein each of the first data transaction and the second data transaction relates to maintenance of the IoT device.

9. The user device of claim 1, wherein the user device comprises a wearable user device.

10. A method for operating a user device, comprising:
receiving a request to connect an Internet of Things (IOT) device to the user device;
in response, connecting the user device to the IoT device using an electronic communication interface of the user device;
detecting that the user device performed a first data transaction relating to the IoT device a pre-configured minimum number of times, wherein the first data transaction qualifies for recording as a behavior when performed at least the minimum number of times;

in response to detecting that the first data transaction was performed the minimum number of times, recording the first data transaction as a behavior;

determining a second data transaction relating to the IoT device to be performed based on the recorded behavior;

determining a schedule according to which the second data transaction is to be performed based on the recorded behavior;

requesting approval to perform the determined second data transaction according to the determined schedule;

receiving the approval; and performing the second data transaction according to the determined schedule, in response to receiving the approval.

11. The method of claim 10, further comprising:

determining based on a type of the IoT device a third data transaction relating to the IoT device and a second schedule for performing the third data transaction, wherein the memory stores the third data transaction and the second schedule for performing the third data transaction corresponding to the type of IoT device; and performing the third data transaction according to the second schedule.

12. The method of claim 10, further comprising:

receiving from the IoT device information relating to a third data transaction relating to the IoT device and a second schedule for performing the third data transaction; and performing the third data transaction according to the second schedule.

13. The method of claim 10, wherein:

the determined schedule comprises performing multiple instances of the second data transaction at respective pre-determined days and times.

14. The method of claim 10, wherein the first data transaction is recorded as the behavior in response to detecting that the first data transaction has been performed a pre-configured number of times in a repeatable pattern.

15. The method of claim 14, wherein the repeatable pattern comprises the first data transaction performed at periodic time intervals.

* * * * *